Patented Nov. 26, 1929

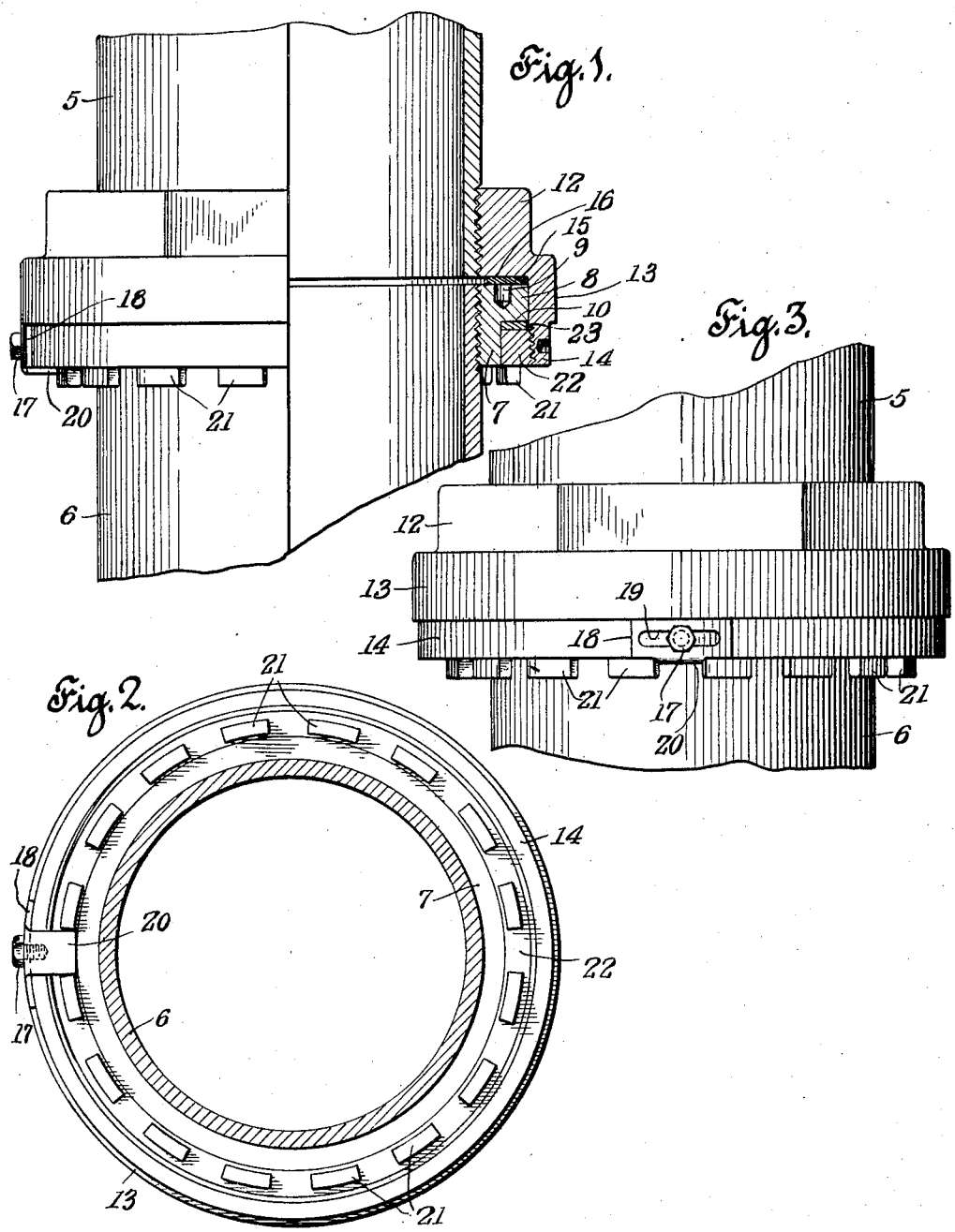

1,736,818

UNITED STATES PATENT OFFICE

RAYMOND L. AUMACK, OF ROSELLE, NEW JERSEY

COUPLING

Application filed September 2, 1927. Serial No. 217,053.

This invention relates to couplings for pipes and other cylindrical objects, and more particularly to couplings which permit the connected pipes to rotate respectively one to the other.

It is therefore one of the objects of the invention to provide a coupling composed essentially of two parts each firmly engaged upon the abutting ends of the pipes to be connected and which will permit relative rotation.

A further feature is in the provision of a coupling to present an impervious joint between coupled elements.

Another purpose is to produce a coupling composed of few and simple parts which can be economically manufactured and easily applied.

These and other important features are accomplished by the novel design, construction and application of parts hereinafter described and shown in the accompanying drawings, forming a material part of this disclosure, and in which:—

Figure 1 is a partial side, partial longitudinal sectional view of two pipes as connected by an embodiment of the invention.

Figure 2 is an end view of the coupling as applied.

Figure 3 is a fragmentary side view of the same, taken in a plane at a right angle to Figure 1.

Describing the drawing more in detail, the numeral 5 designates one of the pipes and 6 the other, the pipes being of the usual thin walled cylindrical type commonly used in conveying liquids and gases.

Such pipes are often used in the conveyance of liquids which necessitate rotation of the various pipe sections and obviously the connections must be of a highly effective type to prevent possible leaks of the liquid conveyed.

Both abutting end portions of the pipes are screw threaded and engaged by the threads of one of the pipes as 6, is an annulus 7 having a diametrically enlarged portion 8 at its outer end, and provided with openings 9 to receive a spanner or like wrench by which the annulus may be firmly secured upon the pipe.

The annulus 7 is machine finished all over including its enlarged outer end, together with a shoulder 10.

On the abutting pipe 5, secured by screw threads, is a collar 12, preferably having a polygonal exterior suited to receive a wrench by which it may be firmly engaged in operative position.

Extending integrally from the collar 12, over the annulus 7, is an enlarged sleeve 13 reduced in diameter at its outer portion 14 internally bored to receive the outer portion 8 of the annulus, there being interposed a gasket 15, of leather or like substance, serving as a packing between the finished seat 16 of the collar and the enlarged portion 8 of the annulus.

The reduced end portion 14 of the collar is internally threaded and provided with a plurality of screw threaded openings to receive screw bolts 17 by which is engaged a keeper 18, curved conformably to the surface of the element 14 and provided with transverse adjusting slots 19 through which the screw 17 passes.

The keeper has an angularly bent clip 20 adapted to engage in the space between two of the adjacent lugs 21 on a ring 22, screw threaded circumferentially to engage with the internal threads of the element 14, its inner surface fitting the exterior of the smaller diametered portion of the annulus 7.

Interposed between the inner edge of the ring 22 and the shoulder of the annulus 8, is a flat brass ring 23 which obviously may be adjustably clamped by the ring 22, which can be turned by a bar or the like engaging the lugs 21, the same being equally spaced over the end of the ring.

In order to provide an effective joint all of the several contacting surfaces are preferably finished by grinding so that accurate fits are maintained, as for instance, the elements 8 and 13, and 7 and 22 while the abutting surfaces contacting with the gasket or brass are similarly finished.

In operation it will be seen that the annulus 7—8 may turn respectively to the collar 12—14, without interfering with the efficiency of the joint, and that the packings 15 and 23 may be adjusted by the ring 22.

Although the foregoing is generally descriptive of the construction and operation of the invention, it will be understood that minor changes may be resorted to within the scope of the appended claims.

Having thus described my invention what I claim as new and desire to secure by Letters Patent is:—

1. A coupling for relatively rotatable cylinders comprising a stepped annulus fixed on one cylinder, a collar fixed on the adjacent cylinder, a sleeve integral with said collar to envelop said annulus, a ring threaded in said sleeve to impinge on the step of said annulus whereby the annulus may be adjusted with respect to said collar, a plurality of lugs extending from said ring, and a keeper clip, said clip including a member adjustably mounted on the sleeve and a projection at right angles to the member to engage between any two adjacent lugs.

2. A coupling for relatively rotatable cylinders comprising a stepped annulus fixed on one cylinder, a collar fixed on the adjacent cylinder, a sleeve integral with said collar to envelop said annulus, a ring threaded in said sleeve to impinge on the step of said annulus whereby the annulus may be adjusted with respect to said collar, a plurality of lugs extending from said ring, and a keeper clip, said clip including a slotted member and a set screw for adjustably mounting the clip on the sleeve, said member having an angular projection adapted to engage between any two adjacent lugs.

This specification signed and witnessed this 25th day of August, 1927.

RAYMOND L. AUMACK.